United States Patent [19]
Hurtado et al.

[11] 3,744,885
[45] July 10, 1973

[54] ANGULAR VIEWING DEVICE

[76] Inventors: Alec Hurtado, 10865 E. Conejo; Eugene A. Fontes, 2655 6th Avenue, both of Kingsburg, Calif. 93631

[22] Filed: Nov. 22, 1971

[21] Appl. No.: 200,696

[52] U.S. Cl. .................. 350/307, 350/299, 350/302
[51] Int. Cl. ............................................. G02b 5/08
[58] Field of Search ................... 350/288, 299, 301, 350/302, 293, 303, 307

[56] References Cited
UNITED STATES PATENTS

| | | | |
|---|---|---|---|
| 2,221,449 | 11/1940 | Hoeninghausen | 350/302 |
| 1,748,837 | 2/1930 | Greensfelder | 350/302 |
| 2,257,510 | 9/1941 | Mote | 350/302 |
| 1,814,667 | 7/1931 | Cowdrey | 350/302 |
| 3,485,555 | 12/1969 | Morris | 350/302 |
| 2,197,280 | 4/1940 | Topping | 350/302 |

*Primary Examiner*—David Schonberg
*Assistant Examiner*—Michael J. Tokar
*Attorney*—Herbert A. Huebner et al.

[57] ABSTRACT

An angular viewing device, for viewing an obscured area adjacent to a vehicle having a side view mirror, the viewing device having a bracket mounted on the vehicle in a predetermined position relative to the area to be viewed and in relation to the side view mirror; a support extended from the bracket; a first mirror mounted on the support in spaced relation from the bracket and in diagonally reflective alignment with the side view mirror; and a second mirror, having a convex reflective surface, mounted on the bracket in reflective alignment with the first mirror and the obscured area.

2 Claims, 6 Drawing Figures

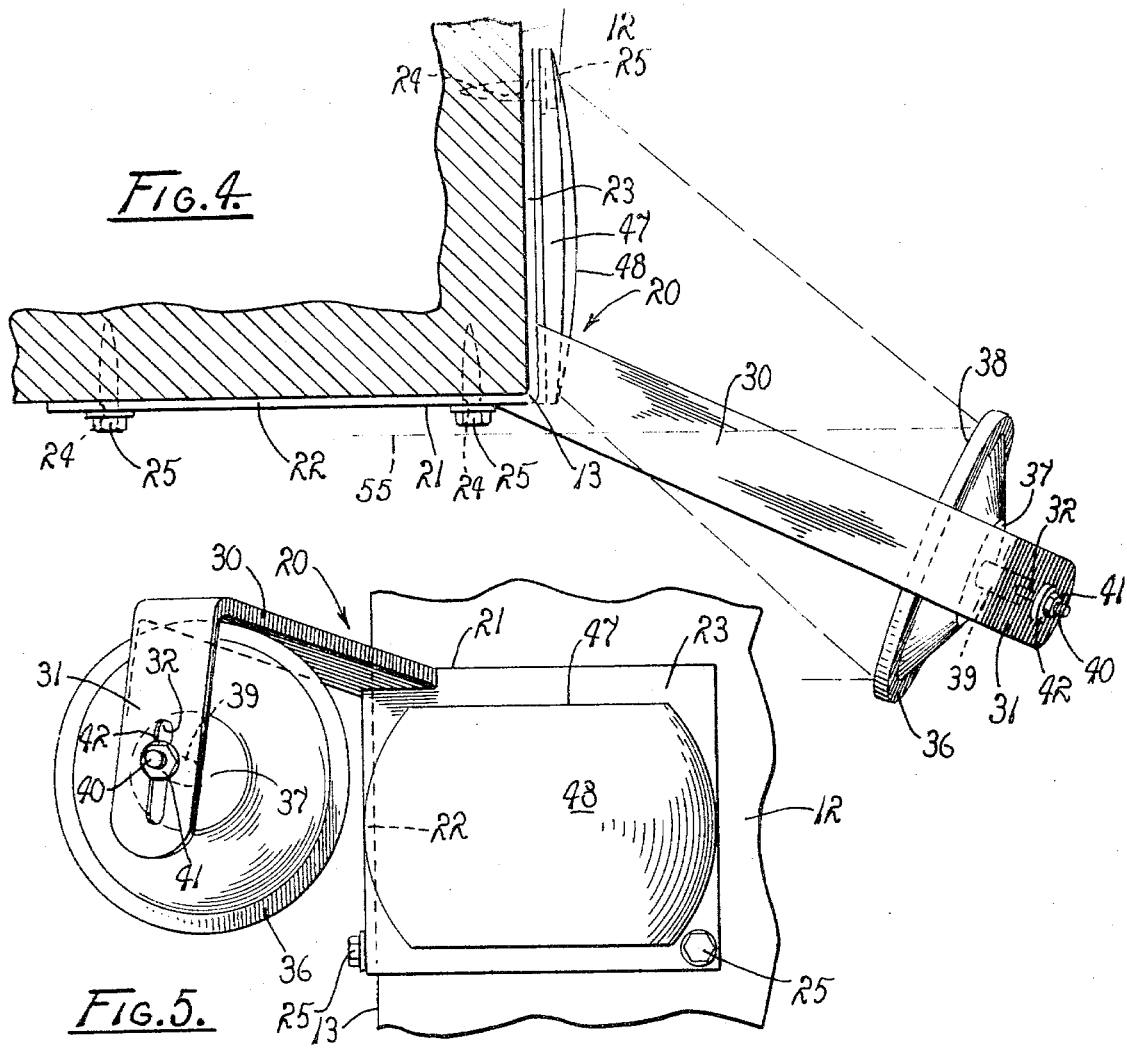
Fig.4.
Fig.5.
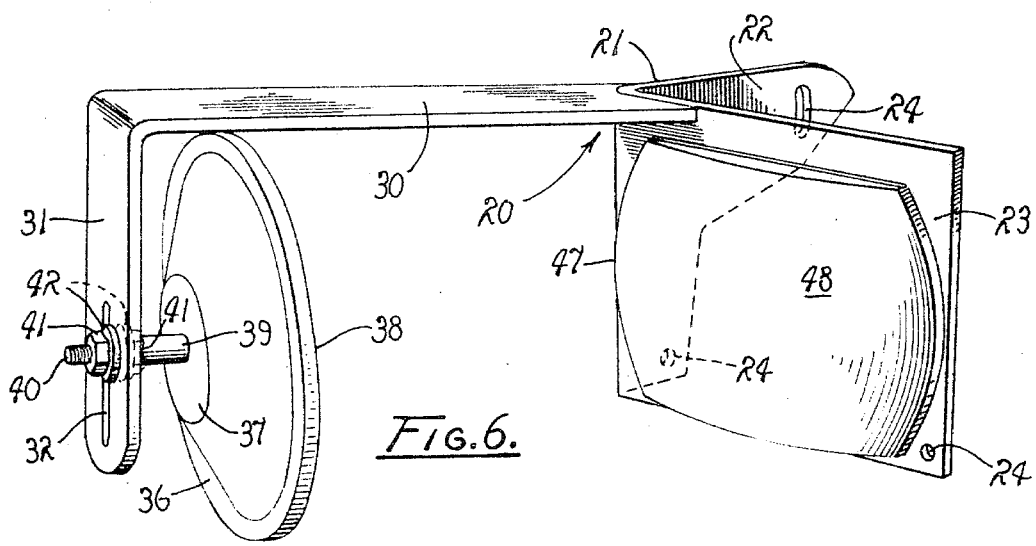
Fig.6.

ANGULAR VIEWING DEVICE

BACKGROUND OF THE INVENTION

There has been a problem common to all large vehicles and particularly campers, trucks and buses in that the area immediately behind the vehicle is completely obscured from view by the driver of the vehicle. During backing of such vehicles, the driver must either get out of the vehicle to check the area prior to backing, or have another person standing to the rear of the vehicle direct him in order to insure safe vehicle operation. Side view mirrors, in themselves, are notoriously inadequate since they do not allow the driver to see immediately behind the vehicle. Many such vehicles are provided with bell-type warning devices which are automatically operated when the vehicle is driven in reverse to alert persons of the approach of the vehicle.

However, none of these expedients has been satisfactory since, in the end, the driver of the vehicle must depend on the alertness of passers-by or the directions of an assistant to insure safe backing of the vehicle. Where no one is available to direct the driver there is danger to inattentive persons in the vicinity, such as infants or small children. In crowded metropolitan areas, the risk to persons and to property is particularly significant.

Accidents resulting from the backing of such vehicles occur all too frequently. Beyond the obvious dangers to persons, the related effects on property are also significant. In commercial operations, such as trucking, such accidents damage equipment, jeopardize cargo, destroy objects inadvertently struck, raise insurance rates, cut into profits and generally reduce the efficiency of the operations. In all cases the danger of such accidents precludes the most efficient use of the vehicles.

It has therefore long been recognized that it would be desirable to have a device which permits the driver of a vehicle to view the area to the rear of such a vehicle as he operates it in order to facilitate backing thereof and to insure safe performance of the operation without having to depend on assistance from others.

SUMMARY OF THE INVENTION

An object of the present invention, therefore, is to provide a viewing device which permits an operator of a vehicle to view the normally obscured area behind the vehicle to facilitate backing thereof.

Another object is to provide such a device which eliminates the need for having other persons assist to insure the safe backing of such vehicles.

Another object is to provide such a device which permits the operator of a vehicle to see a broad area to the rear of the vehicle to insure that vision of all possible hazards is permitted.

Another object is to provide such a device which is adaptable for mounting on a wide variety of types and sizes of vehicles.

Another object is to provide such a device which promotes the most efficient use of the vehicle on which it is mounted.

A further object is to provide such a device which is designed for cooperative operation with a conventional side view mirror mounted on the vehicle.

A still further object is to provide such a device which is of simple, uncomplicated construction.

Other objects and advantages are to provide improved elements and arrangements thereof in a device for the purposes described which is dependable, economical, durable, and fully effective in accomplishing its intended purposes.

BRIEF DESCRIPTION OF THE DRAWINGS

FIG. 4 is a top plan view of the viewing device mounted on a fragmentarily represented portion of the vehicle.

FIG. 5 is a rear elevation of the viewing device mounted on a fragmentarily represented portion of the vehicle.

FIG. 6 is a perspective view of the viewing device.

DESCRIPTION OF THE PREFERRED EMBODIMENT

Figure 1:
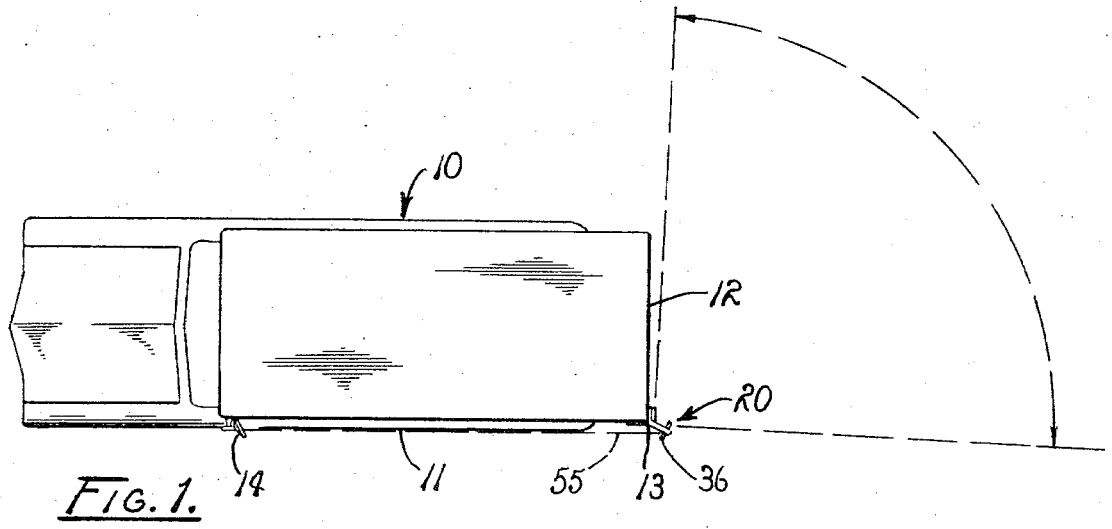
FIG. 1 is a schematic plan view of a vehicle and of the viewing device mounted on the vehicle showing lines of sight permitted by the use of the device.
Figure 2:
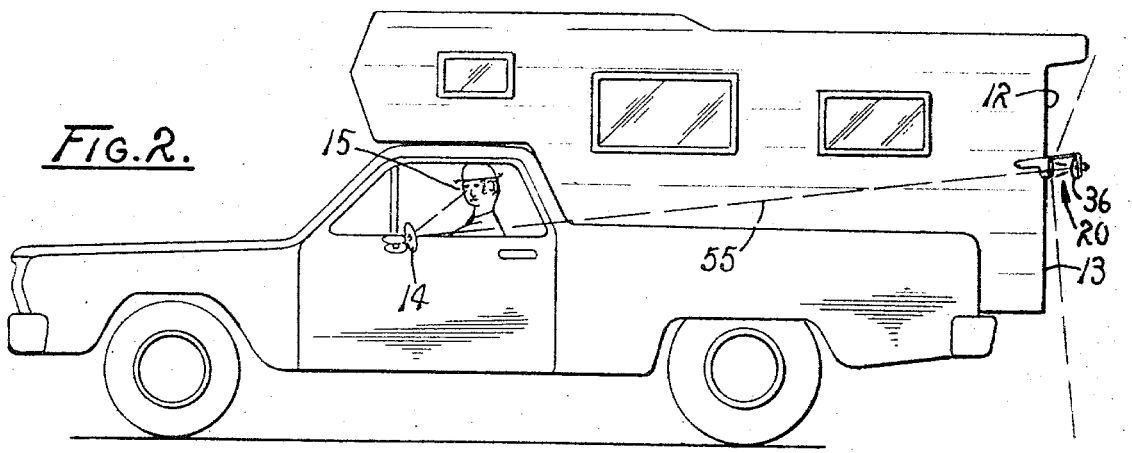
FIG. 2 is a side elevation of the vehicle having the viewing device of the present invention mounted thereon.
Figure 3:
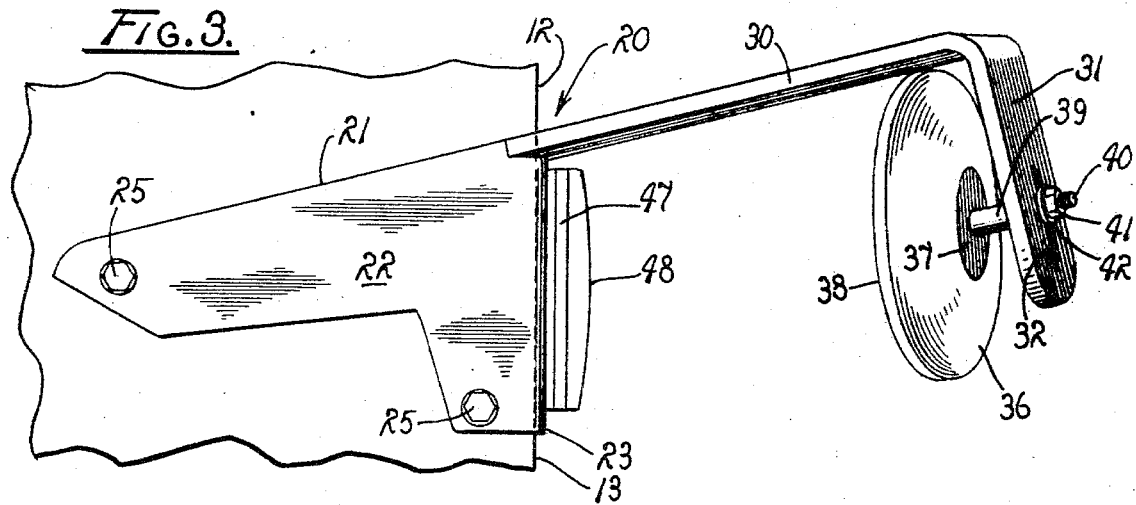
FIG. 3 is a somewhat enlarged, side elevation of the viewing device mounted on a fragmentarily represented portion of the vehicle.

Referring in greater detail to the drawings, a vehicle shown for illustrative purposes as a camper, is generally indicated by the numeral 10, as shown in FIGS. 1 and 2. The vehicle has a left side 11, a rear portion 12 and a left rear corner 13, as illustrated in FIG. 1. A left side view mirror 14, sometimes also referred to as a rear view mirror, of conventional construction is mounted on the vehicle. As viewed in FIG. 2, an operator 15 is shown for illustrative convenience in the vehicle. The side view mirror is mounted on the vehicle in such a position as to permit the operator to view rearwardly along the left side of the vehicle. Conventionally such a mirror does not permit the operator to see anything to the right of a plane coincident with the left side of the vehicle.

The angular viewing device of the present invention is generally indicated by the numeral 20. The viewing device is mounted on the left rear corner 13 of the vehicle 10. It has a mounting bracket 21 consisting of a side flange 22 and a rear plate 23 normal to the side flange and integral therewith. The mounting bracket has screw holes 24 provided therein, as best shown in FIG. 6. Screws 25 are received in the screw holes and threaded into the left rear corner 13 of the vehicle 10 to secure the bracket on the vehicle with the side flange mounted against the left side 11 of the vehicle and the rear plate mounted against the rear portion 12 of the vehicle, as best shown in FIG. 4. Any other suitable means for the fastening of the mounting bracket can be used as most appropriate for the type of vehicle upon which it is to be mounted.

A support arm 30 is provided on the mounting bracket 21 and extends away from the left rear corner 13 of the vehicle 10 in rearwardly and outwardly extended relation thereto. The support arm has a downwardly extending end portion 31 having an elongated vertical bolt slot 32 therein.

A first mirror 36 having a swivel assembly 37 and a planar reflective surface 38 is mounted on the end portion 31 of the support arm 30. A mounting shaft 39 extends from the swivel assembly rearwardly of the first mirror. The mounting shaft has a threaded portion 40 at the end thereof opposite the swivel assembly which is received through the bolt slot 32. A pair of nuts 41 with associates lock washers 42 disposed therebetween are threadably received on the threaded portion of the shaft and tightened against the end portion 31 of the support arm on opposite sides thereof to lock the first mirror on the support. It will be seen that the first mirror is thereby adjustable in a vertical direction in the bolt slot upon loosening of the pair of nuts and is swivelly positionable in a variety of directional attitudes by means of the swivel assembly 37. A second mirror 47 having a convex reflective surface 48 is mounted in fixed position on the rear plate 23 of the mounting bracket 21. The convex mirror may be a segment of a sphere or a segment of a cylinder a vertical axis, as desired, with the latter normally being preferred.

The left side view mirror 14 and the first mirror 36 are adjusted to provide a line of sight 55 running from the operator 15 to the left side view mirror, thence to the reflective surface 38 of the first mirror 36, from thence to the convex reflective surface 48 of the second mirror 47, and thereafter rearwardly of the rear portion 12 of the vehicle 10, as best shown in FIG. 1. It will be evident that a very slight angular sweep of the operator's line of sight in his side view mirror, results in a very wide angular sweep of the line of sight from the convex mirror 48. A viewing range of approximately 90° across the back of the vehicle is readily achieved.

OPERATION

The operation of the described embodiment of the subject invention is believed to be clearly apparent and is briefly summarized at this point. With the angular viewing device 20 mounted on the vehicle 10, and adjusted as described to provide a line of sight 55, the vehicle may be backed by the operator 15 with full view to the rear of the vehicle provided by visual observation through the left side view mirror 14. The permissible sweep of the angle of incidence of the line of sight from the first mirror 36 onto the convex reflective surface 48 of the second mirror 47 provides a permissible angle of reflection of approximately 90° toward the obscured rear and sides of the vehicle, as best shown in FIG. 1. The amplification of the convex reflective surface presents an expanded image of the area to the rear of the vehicle. While the distance between the left side view mirror and the first mirror is such that the image presented in the left side view mirror is rather small, such amplification of the details of the image by the convex reflective surface of the second mirror is abundant to provide visual observation of all possible hazards so as to guide the operator in the backing of the vehicle.

It will be seen that the device 20 of the present invention is fully adaptable for use on a variety of types of vehicles including campers, trucks, buses, automobiles, and the like. Once adjustment of the left side view mirror 14 and the first mirror 36 is accomplished, the device is ready automatically to be used at any time the operator 15 desires to do so without further adjustment of the device. In darkness, illumination by conventional backup lights provided on the vehicle is sufficient to present a reflected image for backing of the vehicle. The operator is thus fully capable of backing the vehicle day or night without dependence on directions from a second person and without reliance upon the alertness of passers-by.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. An angular viewing device adapted to be mounted on an automotive vehicle having a rear corner and a side view mirror mounted on the vehicle in spaced relation to the rear corner and defining a line of sight in the direction of the rear corner, the device comprising a bracket adapted to be secured on the rear corner of the vehicle, the bracket having a side flange and a rear plate; a convex mirror affixed on the plate facing rearwardly of the vehicle; an arm rigid with the bracket at the juncture of the flange and plate extending rearwardly and outwardly therefrom into the line of sight of the rear view mirror; a substantially flat mirror; and means mounting the flat mirror on the remote end of the arm for elevational and swivel adjustment so as to be positionable to receive reflections from the convex mirror and to direct them to the side view mirror of the vehicle.

2. The angular viewing device of claim 1 in which the convex mirror is substantially a segment of a cylinder having a vertical axis to provide a maximum field of a vision rearwardly of the vehicle with a minimum degree of reflective distortion.

* * * * *